United States Patent [19]
Dooley

[11] 3,774,203
[45] Nov. 20, 1973

[54] HOLOGRAPHIC DEPTH CORRECTION

[75] Inventor: John W. Dooley, Brooklyn, N.Y.

[73] Assignee: Kuhlenschmidt-Dooley Corporation, Brooklyn, N.Y.

[22] Filed: Nov. 24, 1971

[21] Appl. No.: 201,657

[52] U.S. Cl............. 343/5 R, 73/67.5 H, 340/5 H, 350/3.5, 343/6 R, 343/17
[51] Int. Cl........................ G01s 9/02, G02b 27/22
[58] Field of Search.................... 343/5 R, 6 R, 17; 340/5 H; 73/67.5 H; 350/3.5

[56] References Cited
UNITED STATES PATENTS

| 3,410,363 | 11/1968 | Schwartz | 340/5 H |
| 3,559,465 | 2/1971 | Preston, Jr. | 73/67.5 H |
| 3,534,326 | 10/1970 | Glenn, Jr. | 350/3.5 |
| 3,488,656 | 1/1970 | Anderson | 343/17 |

Primary Examiner—Malcolm F. Hubler
Attorney—Norman H. Stepno et al.

[57] ABSTRACT

Apparatus and method for correcting information used in construction of phase-only holograms to reduce or eliminate depth distortion. Reference signals are constructed from received longer wavelength signals for use in converting the phase differences as received into greater phase differences corresponding to the use of shorter wavelength signals. The greater phase difference signals allow construction of a hologram which can be read out with waves of the shorter wavelength.

8 Claims, 5 Drawing Figures

PATENTED NOV 20 1973 3,774,203

HOLOGRAPHIC DEPTH CORRECTION

BACKGROUND OF THE INVENTION

1. Field of the Invention

This invention relates to a data-processing technique for use in constructing holograms, and more particularly to a technique for processing holographic information derived using relatively long wavelengths, such as those of sound or of microwaves, and preparing therefrom holograms which can be read with relatively short wavelengths, such as those of light, with little or no resulting depth distortion.

2. Description of the Prior Art

The prior art recognizes that when a hologram is illuminated with a beam whose wavelength is shorter than the wavelength used to record the hologram zone-plate pattern, the result is a decrease in the diffracted angle of the emerging diffracted wavefronts. Images are thus formed further from the plane of the hologram, and the images are increased in apparent depth. A complete discussion of the problem is found in a 1969 *Scientific American* article entitled "Acoustical Holography" by Alexander F. Metherell.

The problem of depth distortion is quite acute when it is attempted to view acoustical (or sound) holograms by coherent light. The degree of stretching out or depth magnification is equal to the ratio of the recording wavelength to the visible wavelength. The ratio of the wavelength of a one megaHertz sound in water to that of typical red laser light is 500 to 1, resulting in a depth magnification of 500 times when such a sound-created hologram is viewed in red light. As the *Scientific American* article points out, a number of methods have been proposed for eliminating this depth distortion, but none is completely satisfactory. Generally, these holograms are viewed in two dimensions by projection onto a screen. The third or depth dimension is observable only by moving the screen through the depth dimension so that the focused picture on the screen represents two dimensions of the image at the chosed depth.

SUMMARY OF THE INVENTION

Basically, the invention is a data-processing system for intercepting the information in waves received from an object being probed or "holographed" by relatively long wavelengths, such as sound, preferably radiated in bursts, and for converting that information to produce a hologram in which the various points on the hologram represent the same phase shift information which would have occurred if the hologram had been made with a shorter wavelength, such as light. When this is done, the hologram can be read out with that shorter wavelength without depth distortion.

This conversion is accomplished by the generation of two reference signals keyed to the phase shifts between the reflected wave and a synthetic recording wave. By the use of the method and system of the present invention, the two reference signals are so derived that, either continuously or during a predetermined time interval, they have phase differences equal to the phase shifts between the reflected wave and the imaginary recording wave multiplied by the ratio of the long wavelengths of the recording waves to the shorter wavelengths of the reading or light waves.

There are several possible ways to generate the two reference signals. In one system a first continuous wave oscillator (CWO) is locked in phase with one cycle of the burst of radiated signal and is connected in a phase-locked loop with the received reflected signal, whereby the output signal of the first CWO is a first reference signal continuously adjusted by feedback to maintain a frequency valve such that it accumulates a total phase shift (with respect to the radiated signal) equal (plus or minus an integral multiple of 360°) to that of the received reflected signal by the time the reflected signal is received. At this maintained frequency value, the output of the first CWO will accumulate twice as much total phase shift in twice as much time, and similarly for any desired multiple of phase shift. A second CWO is controlled to generate a second reference signal as a continuous wave locked in phase and frequency to the bursts of radiated signal. By sampling the phase difference between the outputs of the first and second CWO's after an interval of time which is N times the interval between transmission of the initial burst and receipt of the reflected wave, the phase difference thus measured has a value which is N tines the phase difference at the time of receipt of the reflected wave. If this value N is chosen to equal the ratio of the longer wavelength to the shorter wavelength as previously set forth, then the measured phase differences have the desired values to allow reconstruction of the image from the hologram with coherent waves of the shorter wavelengths.

There is a disadvantage to the system just set forth. Typically the bursts of radiated signal form a train of signals at some steady repetition rate. The receiving element, such as a microphone, is scanned through a raster to sequentially independently receive phase shift information at a sequential plurality of detection points. The speed at which this scanning can take place is dependent upon the repetition rate of the radiated signals. With the previously explained system, it is necessary to have a repetition rate slow enough to allow a time interval of N times the interval from initial radiation to receipt of the reflected signal between each of the bursts of radiated signal. In another embodiment of the invention, it is possible to reduce the interval by which N is multiplied and still properly correct the phase shift information.

In this improved embodiment of the invention, a delayed version of the radiated burst is used to provide the initial phase-lock information for the first reference signal from the first CWO instead of the undelayed burst. Any kind of delay 'ine could be used, but the simplest delay is provided by immersing a receiver in the same wave-transmitting medium which surrounds the object being probed, and receiving a delayed version of the burst before the reflected waves are received. When the initial phase lock is to the delayed burst and the phase-locked loop locks the frequency according to the phase of the received reflected signal, then the time base for accumulating the actually measured phase shift is reduced to the interval between the delayed burst and the receipt of the reflected waves. A period of N times this reduced time base is sufficient to accumulate the phase shift which would exist at the shorter wavelengths. The use of this reduced accumulation period allows the use of a higher pulse repetition rate for the transmitted burst, and thereby allows faster scanning to produce a hologram.

In another embodiment of the invention believed useful only with ultrasonic detection, an electrical signal in the range of 3 gigaHertz is used because, if an ultrasonic signal of that frequency could be generated and used for probing, it would have the same wavelength in water as does light in a vacuum. Of course such high frequencies cannot be used for ultrasonic probing, but they are available as electrical signals. This embodiment of the invention uses the 3 GHz electrical signals to replace the electrical representations of the ultrasonic signals. For this replacement, a 3 GHz signal can be initiated by the received reflected signal as a first reference signal and a second 3 GHz signal can be initiated by the transmitted signal as a second reference signal. A comparison of the two 3 GHz reference signals during some later predetermined time interval (before the next radiated burst) will yield the same phase difference information as would be yielded by interference between light waves of the same wavelength in vacuum as the 3 GHz signals would have in water. Acoustic holograms are typically made in a water medium to allow the effective use of higher frequency sound than in air.

The best contemplated use of this invention is in converting acoustical holographic information (made with longer ultrasonic waves) into holographically recorded data of the same phase shifts as would be provided if the record could be made using the shorter wavelengths of visible light. Such acoustical holographic use may some day find extensive use as a substitute for medical and industrial X-ray. However the invention is equally applicable to microwave holography, such as is used in radar, and to any other area of holography using longer wavelengths than light for probing an object.

DESCRIPTION OF THE PREFERRED EMBODIMENTS

Figure 1:
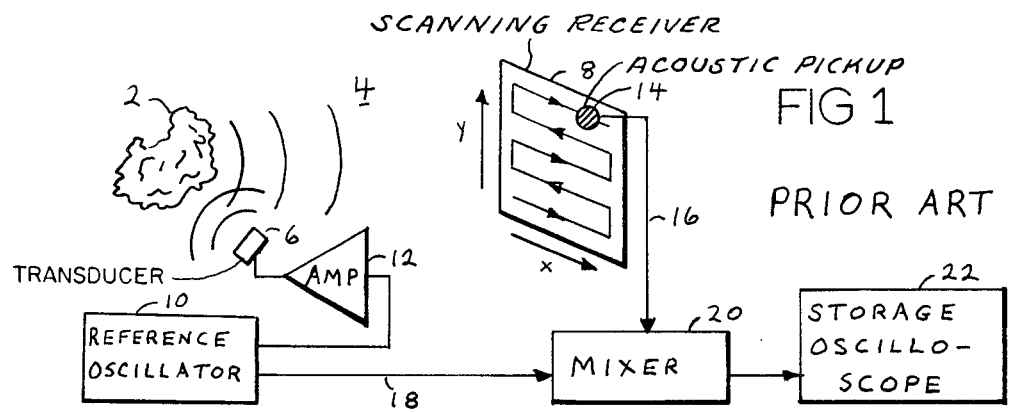
FIG. 1 is a schematic block diagram of a prior art acoustic holography system.

FIG. 1 is a schematic block diagram of an acoustic holography system as used in the prior art. An object 2 is placed in a wave-transmitting medium 4, together with a means 6 for transmitting ultrasonic energy into the medium 4 toward object 2, and a means 8 for scanning a plurality of detection points for receiving ultrasonic wave energy reflected from the object. A continuous-wave reference oscillator 10 provides a continuous wave of electrical energy through an amplifier 12 to cause transmitting means 6 to transmit a corresponding continuous wave of ultrasonic energy. An acoustic pickup means 14 in scanning means 8 receives the reflected ultrasonic energy and converts it into a corresponding electrical signal on line 16.

The reference oscillator provides another continuous wave signal on line 18 corresponding to that provided to the transmitting means 6. The signals on lines 16 and 18 are mixed in a mixer 20 to derive phase difference output signals. These output signals are recorded on a storage oscilloscope 22 which is scanned in synchronization with the scanning means 8. Thus a pattern of signals appears on the face of storage oscilloscope 22 which can be photographed to provide a hologram. However, the hologram thus produced, if used with visible light to reconstruct an image, results in severe depth distortion.

Figure 2:
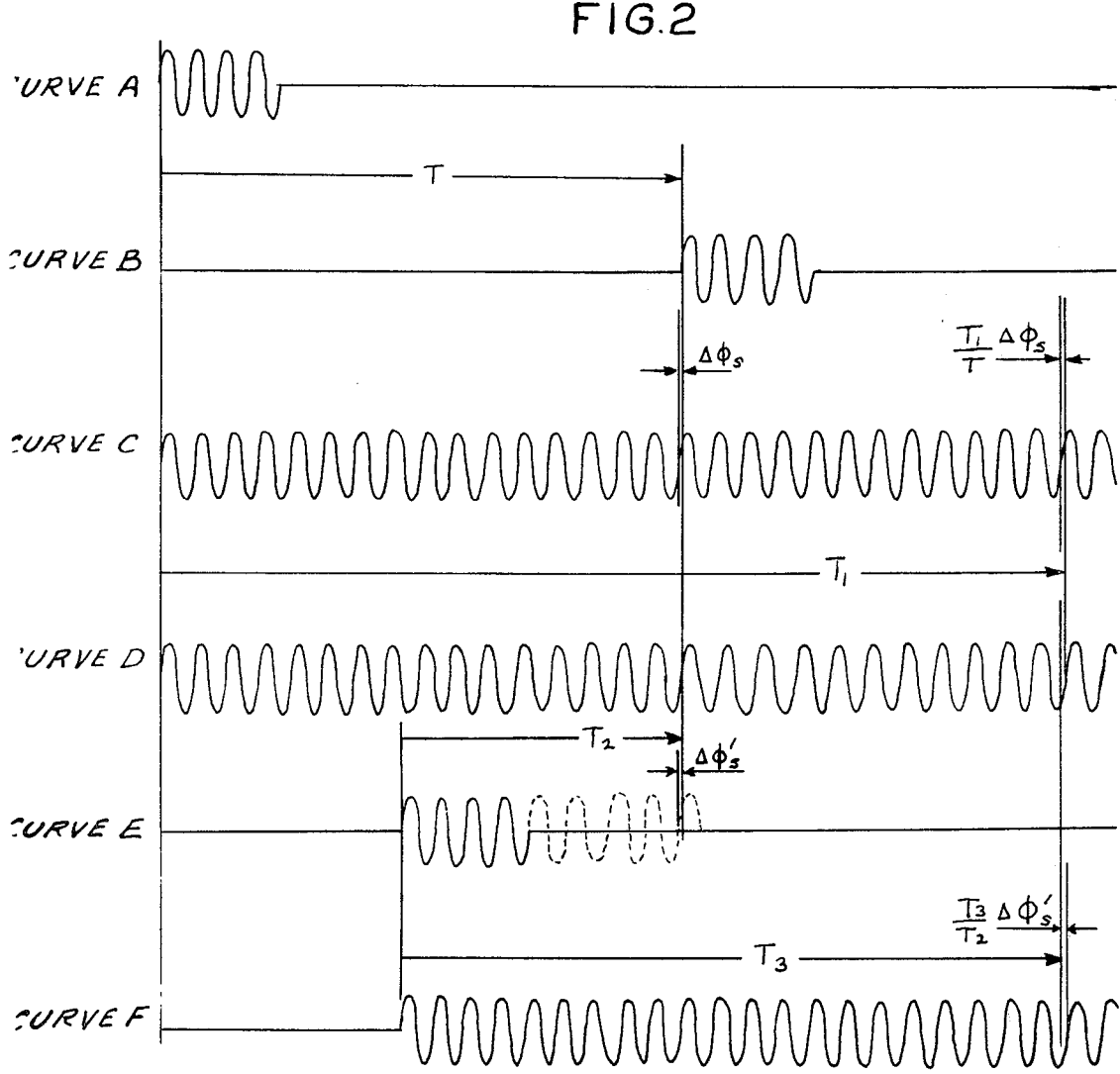
FIG. 2 are illustrations of waveforms illustrative of the present invention.

The preferred embodiments of the present invention use periodically repeated bursts of high-frequency energy rather than continuous-wave energy to probe the object. Curve A of FIG. 2 illustrates a burst of high-frequency wave energy as transmitted toward an object and curve B illustrates the received reflected pulse an interval T later. It should be noted that, in the drawings, the intervals between pulses are not drawn to the same scale as the pulses, since to do so would require an unusually long figure. As mentioned in the previous summary of the invention, an embodiment of the invention is possible in which a second reference signal (curve C) is started with the transmitted poulse, synchronized in phase and frequency with the transmitted pulse. This second reference signal will be out of phase by an amount $\Delta\phi s$ (difference in phase for sound) with the received reflected wave. A first reference signal (curve D) is started in phase with the transmitted pulse, but its frequency is controlled by a phase-locked loop which adjusts the frequency to keep a later part of the first reference signal in phase with the received reflected signal. This adjustment of the frequency of the first reference wave causes a continuous accumulation of phase difference between the first and the second reference waves until, at time $T_1$, an error of $T_1/T \Delta\phi s$ has accumulated. By sampling the phase difference after a chosen time interval $T_1$, the value of $\Delta\phi s$ can be multiplied by any desired constant. It should be noted that multiplication of a phase difference by a constant is not the same as multiplication of a number by a constant. For example, $1° \times 360 = 360° = 0°$. Thus the multiplication is more complex than analog multiplication.

Figure 3:
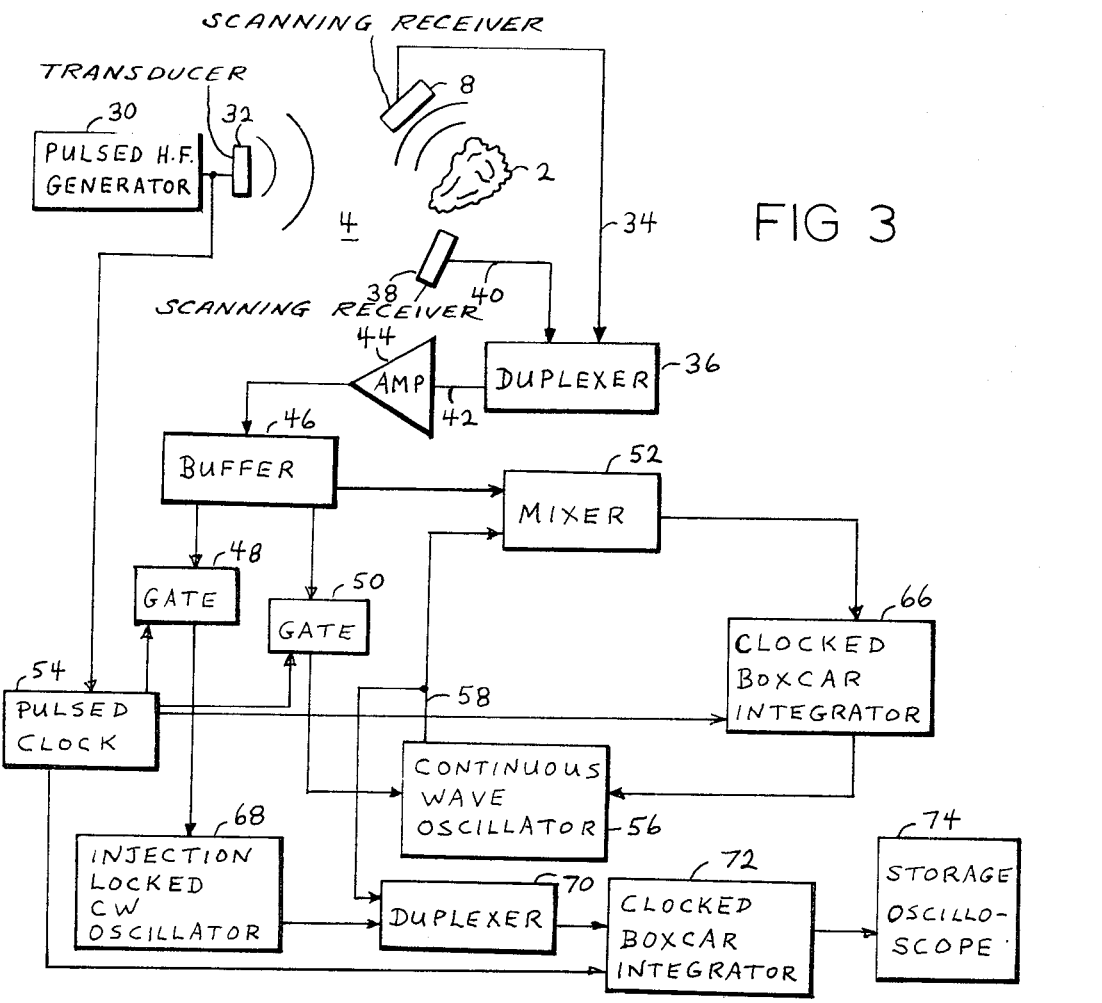
FIG. 3 is a schematic block diagram of one embodiment of the present invention.

Because of the excessive time required to use the embodiment just explained, the system of FIG. 3 is preferred to the previously explained embodiment.

In FIG. 3, a pulsed signal as shown in curve A is generated by a generating means 30 and transmitted by a transmitting means 32 toward an object 2 immersed in a medium 4. A scanning receiver 8 receives the reflected signals (curve B) at a plurality of successive points and provides a corresponding electrical signal on line 34 to a duplexer 36. An additional receiver 38 receives a delayed version of the transmitted signal (curve E, in solid lines) and provides a corresponding electrical signal via line 40 to the duplexer. The output from the duplexer on line 42 contains the signals from lines 34 and 40 in sequence and is amplified by amplifier 44 and buffered by buffer 46 to provide identical signals to gates 48 and 50 and mixer 52. A pulsed clock is controlled by the bursts of energy from generator 30 to provide output signals of appropriate durations after appropriate delays to control the operation of various other elements of the system. Clock 54 operates gate 50 to pass the signal from receiver 38 (curve E) while blocking the signals from receiver 8 (curve B). The signal from gate 50 is applied to a continuous-wave oscillator 56 to lock the initial phase of the oscillator output on line 58 to the phase of one cycle of the signal from receiver 38, as illustrated in Curve F. Since an oscillator pulsed in this way always has the same relationship to the controlling pulse, the oscillator will perform in the same manner for each sequential burst of radiated signal.

Figure 4:
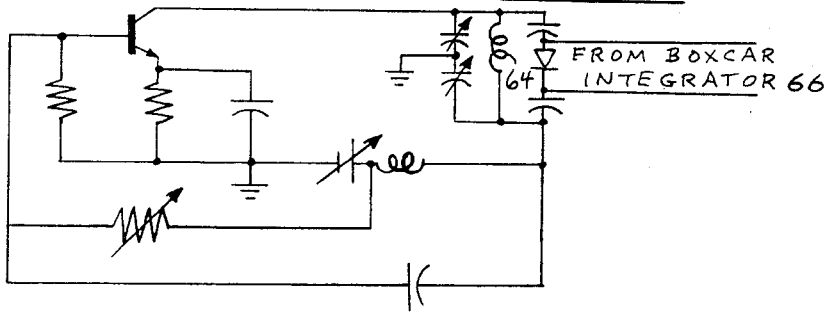
FIG. 4 is a schematic diagram of a Colpitts oscillator useful as an injection locked continuous wave oscillator in the embodiment of FIG. 3.

FIG. 4 is a schematic diagram of a Colpitts oscillator which can be used as oscillator 56 in FIG. 3. This oscillator is more fully illustrated in an article by John W. Dooley in *The Journal of the Acoustical Society of America*, Vol. 47, No. 5 (Part 2), May 1970, at page 1233. Three coils 60, 62 and 64 are placed in electromagnetic proximity. Coil 60 is connected to receive the output from gate 50. Coil 62 is connected to provide an output to line 58. The third coil 64 is connected in a tank circuit, which includes a varicap diode connected across an input from a clocked boxcar integrator 66. The signals from buffer 46 and from line 58 are mixed in mixer 52 to provide an error signal to the clocked boxcar integrator 66. The boxcar integrator is clocked to operate only during the interval when receiver 8 is receiving the reflected pulse signal of curve B. The phase-difference error between the signals applied to mixer 52 is integrated by integrator 66 to produce a control signal applied to oscillator 56 to control the output frequency of oscillator 56. When the output of oscillator 56 is locked in phase to the signal on line 8, the error signal from mixer 52 is at a minimum and oscillator 56 is then at a stable frequency. While this discussion has referred to locking various signals in phase, it is easier and equally effective to lock the signals 180° out of phase.

A second oscillator 68 is injection by a signal from gate 48. Gate 48 is pulsed to pass the received reflected signal from receiver 38, which is used to lock oscillator 68 in phase and in frequency to provide a synthetic recording wave. The synthetic recording wave from oscillator 68 and the output signal of curve F from oscillator 56 are mixed in a duplexer 70 to provide an output signal to a clocked boxcar integrator 72 proportional to their phase difference. After a time interval $T_3$, the integrator 72 is enabled to integrate a segment of the input phase difference signal, where, as illustrated, $T_3/T_2$ equals the ratio of the longer radiated wavelength to the shorter read-out wavelength. The output of integrator 72 is applied to a storage oscilloscope 74 which is scanned in synchronization with receiver 8 to provide a phase-only hologram on the screen. This hologram on the screen can be recorded on film and be read out with coherent light without depth distortion.

Figure 5:
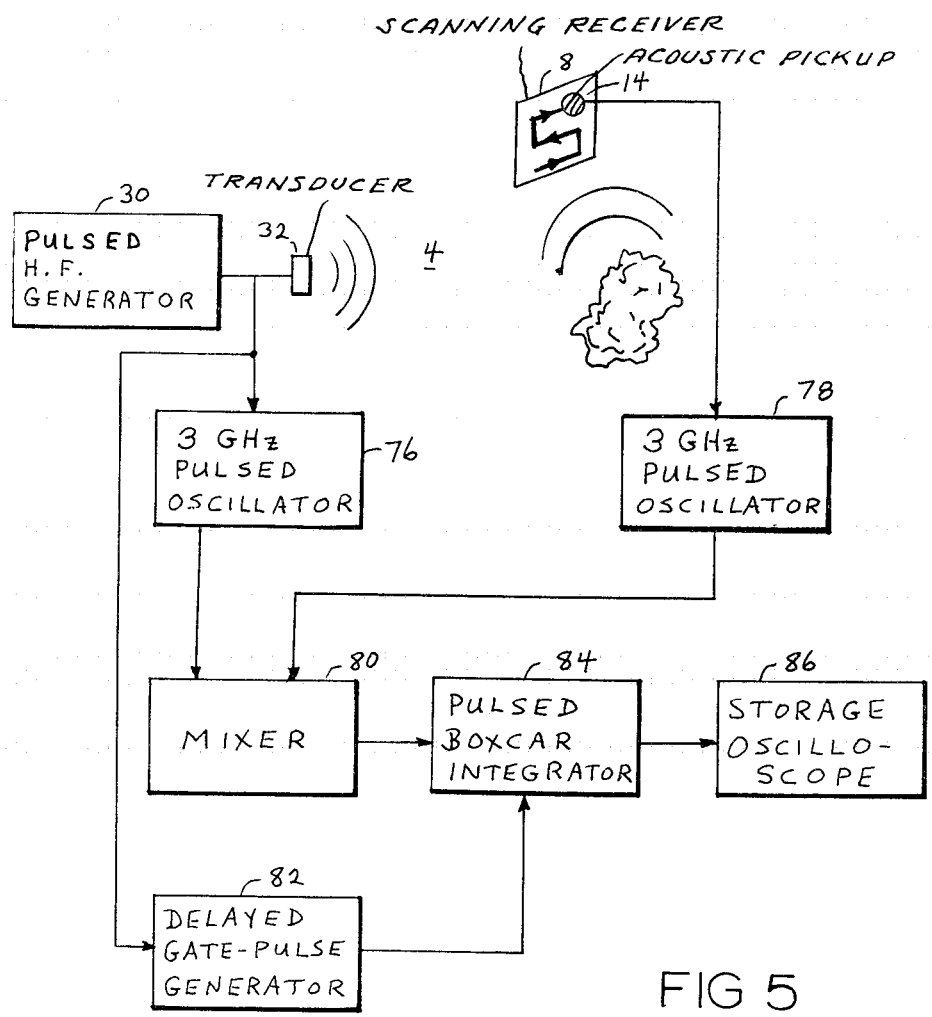
FIG. 5 is a schematic block diagram of another embodiment of the present invention.

FIG. 5 is a schematic block diagram of another embodiment of the invention. Elements, 2, 4, 8, 14, 30 and 32 are as in the previous figures. Two identical 3 GHz pulsed oscillators 76 and 78 are provided, one to be triggered ON for perhaps one millisecond by the transmitted pulse from generator 30 and one to be similarly triggered ON by the received pulse from receiver 14. The outputs of oscillators 76 and 78 are applied to a mixer 80 to provide an output signal having a phase difference equal to the phase difference between the outputs of generator 30 and receiver 14 multiplied by the ratio of 3 GHz to the frequency of the signal from generator 30. The phase difference signal from mixer 80 is integrated in a boxcar integrator 84 over an interval determined by a delayed gate-pulse generator 82 between generator 30 and integrator 84. The precise interval is not important, but it should occur after oscillator 78 has started and before generator 30 has emitted a new pulse. The output of integrator 84 is applied to a storage oscilloscope 86, operated synchronously with receiver 14, to produce a phase-only hologram on the screen of the oscilloscope. This hologram can be recorded on film and reproduced with coherent light without depth distortion.

In ultrasonic acoustic holography, the typical radiated sound frequency is 10 to 50 MHz, the coherent light used for read-out has a typical wavelength of $5 \times 10^{-5}$ cm, the ultrasonic pulses have a width on the order of 1 microsec. and a pulse repetition rate of 50 to 100 pps, and typical delay times are on the order of 3 to 300 microsec. for medical uses. For seismic uses, much longer delay times are needed.

The invention might also be used to leave a somewhat enhanced depth effect by failure to completely correct the depth error or to flatten the image somewhat by over-compensation. In the first disclosed embodiment of the invention using the non-delayed transmitted burst to control generation of reference signals, transmitted radio frequency energy from generator 30 can be directly picked up at the input of amplifier 44 to provide the appropriate the output signals.

While the invention has been described in connection with preferred embodiments, variations are possible within the scope of the invention. Accordingly, the scope of the invention is determined by the appended claims.

I claim:

1. Apparatus for constructing a hologram by probing an object with wave energy having a first wavelength, said hologram to be used to reconstruct an image of the object by using wave energy of a second shorter wavelength, comprising:
   A. means for deriving first electrical information in terms of a complex set of phase shifts of said wave energy having a first wavelength holographically representing the object,
   B. means responsive to said first electrical information for multiplying each of said phase shifts by the ratio of said first wavelength to said second wavelength to provide additional electrical information holographically representative of said object in terms of the set of said multiplied phase shifts, and
   C. means responsive to said additional electrical information for constructing said hologram from said multiplied phase shifts.

2. Apparatus according to claim 1 wherein said wave energy having a first wavelength is ultrasonic energy and said wave energy of a second shorter wavelength is visible light energy.

3. Apparatus according to claim 1 wherein said wave energy having a first wavelength is microwave energy and said wave energy of a second shorter wavelength is visible light energy.

4. Apparatus for deriving phase only holograms by the use of wave energy at a first longer wave length to obtain a first complex set of phase shifts holographically representative of an object from which said wave energy is reflected and by processing the information representative of said first set of phase shifts to multiply the first phase shifts by a constant factor to obtain and holographically record data represented by second phase shifts of a magnitude which would exist if the wave energy reflected from the object were of a second shorter wavelength, comprising:
   A. means for generating a series of first pulses of wave energy, said pulses containing a burst of said wave energy at a first high frequency, said first frequency having a value such that, when directed through a wave-transmitting medium by which said object is surrounded, wave energy of said first longer wavelength results, B. means for transmitting said first pulses through said medium toward said object, C. means for independently receiving said wave energy reflected from said object at each of a plurality of detection points to obtain a corresponding plurality of signals bearing information holographically descriptive of said object in terms of said first phase shifts a4 each of said detection points, D. means for generating a first reference signal having a phase at least partially controlled by the phase of the high-frequency wave energy in each of the received reflected first pulses, E. means for generating a second reference signal having a phase controlled by the phase of the transmitted wave energy, and F. means for sampling and recording phase differences between the first reference signal and the second reference signal at a series of predetermined times when each of said phase differences are substantially equal to the respective phase shifts received at each of said detection points multiplied by the ratio of said first wavelength to said second wavelength 5. Apparatus according to claim 4 wherein said means for generating a first reference signal comprises:

A. a first oscillator for generating said first reference signal,

B. means for controlling the first oscillator to cause the initial phase of said first reference signal to be synchronized with the phase of the high frequency wave energy in the transmitted first pulses, and C. means for controlling the frequency of said first oscillator to lock the phase of a later portion of the first reference signal to said high-frequency wave energy in the received reflected wave energy, and wherein said means for generating a second reference signal comprises:

D. a second oscillator for generating said second reference signa', and

E. means for controlling said second oscillator to cause said second reference signal to be locked in phase and frequency to the transmitted first pulses.

6. Apparatus according to claim 5 wherein said means for controlling the first oscillator to cause the initial phase of said first reference signal to be synchronized with the phase of the high frequency wave energy in the transmitted first pulses comprises means to cause said initial phase of the first reference signal to be synchronized with the phase of the high frequency wave energy in a delayed Version of the transmitted first pulses.

7. Apparatus according to claim 5 wherein said means for controlling the first oscillator to cause the initial phase of said first reference signal to be synchronized with the phase of the high frequency wave energy in the transmitted first pulses comprises means to cause said initial phase of the first reference signal to be synchronized with the phase of the high-frequency wave energy in a non-delayed version of the transmitted first pulses.

8. Apparatus according to claim 4 for use with ultrasonic acoustic holography wherein said means for generating a first reference signal comprises:

A. a first oscillator for generating a first reference signal at a given high frequency which would have a wavelength in said medium similar to the wavelength of light, and B. means for triggering said first oscillator to begin oscillation at a given phase relationship with said received reflected pulses, and wherein said means for generating a second reference signal comprises:

C. a second oscillator for generating a second reference signal at said given high frequency, and D. means for triggering said second oscillator to begin oscillation at said given phase relationship with said transmitted pulses.

* * * * *